(12) United States Patent
Jaegle et al.

(10) Patent No.: US 9,810,179 B2
(45) Date of Patent: Nov. 7, 2017

(54) GAS INJECTOR FOR THE DIRECT INJECTION OF GASEOUS FUEL INTO A COMBUSTION CHAMBER

(71) Applicant: Robert Bosch GmbH, Stuttgart (DE)

(72) Inventors: Felix Jaegle, Ditzingen (DE); Olaf Ohlhafer, Erligheim (DE); Joerg Schoefer, Gerlingen (DE); Robert Giezendanner-Thoben, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 373 days.

(21) Appl. No.: 14/599,071

(22) Filed: Jan. 16, 2015

(65) Prior Publication Data

US 2015/0204275 A1   Jul. 23, 2015

(30) Foreign Application Priority Data

Jan. 17, 2014   (DE) .................. 10 2014 200 756

(51) Int. Cl.
   *F02M 21/02*   (2006.01)
   *F02M 45/08*   (2006.01)
   *F02M 45/12*   (2006.01)

(52) U.S. Cl.
   CPC .... *F02M 21/0263* (2013.01); *F02M 21/0269* (2013.01); *F02M 21/0275* (2013.01); *F02M 45/08* (2013.01); *F02M 45/12* (2013.01); *Y02T 10/32* (2013.01)

(58) Field of Classification Search
   CPC ........... F02M 21/0263; F02M 21/0269; F02M 21/0275; F02M 45/08; F02M 45/12; F02M 21/02; F02M 61/08; Y02T 10/32; B05B 1/323

USPC ........... 239/533.7, 533.4, 533.5, 533.9, 453; 251/118–127, 129.01–129.22, 339; 123/294, 295, 296, 297, 298, 299, 300, 123/301, 302, 303, 304, 305, 500, 528, 123/529, 527, 575, 27 GE; 137/505.18

See application file for complete search history.

(56) References Cited

U.S. PATENT DOCUMENTS

| | | | | |
|---|---|---|---|---|
| 3,450,353 A | * | 6/1969 | Eckert ................ | F02M 51/0685 239/453 |
| 3,542,293 A | * | 11/1970 | Bishop .................. | F02M 61/08 123/188.8 |
| 4,408,722 A | * | 10/1983 | Frelund .................. | F02M 61/06 239/453 |
| 4,573,659 A | * | 3/1986 | Homes ................. | F02M 59/366 239/459 |
| 4,641,784 A | * | 2/1987 | Howes .................. | F02M 61/08 239/453 |

(Continued)

*Primary Examiner* — Thomas Moulis
*Assistant Examiner* — John Bailey
(74) *Attorney, Agent, or Firm* — Norton Rose Fulbright US LLP; Gerard Messina

(57) ABSTRACT

A gas injector for the direct injection of gaseous fuel into a combustion chamber of an internal combustion engine, including a valve seat, a valve needle, which in response to a lift releases a first cross-sectional area at the valve seat, and a gas control region, which is situated at the valve needle and defines a second cross-sectional area together with a component surrounding the valve needle, and in response to a lift, a change in the first cross-sectional area at the valve seat differs from a change in the second cross-sectional area at the gas control region.

19 Claims, 7 Drawing Sheets

(56) References Cited

U.S. PATENT DOCUMENTS

| | | | | |
|---|---|---|---|---|
| 4,685,432 A * | 8/1987 | Saito | F02B 23/0624 | 123/263 |
| 4,691,864 A * | 9/1987 | Greeves | F02M 61/08 | 239/453 |
| 4,708,289 A * | 11/1987 | Szablewski | F02M 51/0671 | 239/125 |
| 4,813,599 A * | 3/1989 | Greiner | F02M 51/0621 | 239/456 |
| 4,993,643 A * | 2/1991 | Schechter | B05B 1/12 | 239/499 |
| 5,031,841 A * | 7/1991 | Schafer | F02M 61/20 | 239/459 |
| 5,080,287 A * | 1/1992 | Takeda | F02M 51/0675 | 239/533.12 |
| 5,156,342 A * | 10/1992 | Takeda | F02M 51/0675 | 239/585.1 |
| 5,161,743 A * | 11/1992 | Takeda | F02M 51/0675 | 239/533.11 |
| 5,282,577 A * | 2/1994 | Neitz | F02M 45/08 | 137/625.37 |
| 5,467,757 A * | 11/1995 | Yanagihara | F02B 1/12 | 123/27 R |
| 5,494,015 A * | 2/1996 | Rynhart | F02M 49/02 | 123/294 |
| 5,497,947 A * | 3/1996 | Potz | F02M 61/045 | 239/533.12 |
| 5,711,277 A * | 1/1998 | Fuseya | F02M 45/08 | 123/179.17 |
| 5,853,124 A * | 12/1998 | Beck | F02M 61/18 | 239/5 |
| 6,109,540 A * | 8/2000 | Coldren | F02M 61/08 | 239/87 |
| 6,311,950 B1 * | 11/2001 | Kappel | F02M 51/0603 | 251/129.06 |
| 6,431,472 B1 * | 8/2002 | Tian | F02M 61/08 | 239/533.7 |
| 6,508,418 B1 * | 1/2003 | Fochtman | F02M 51/0625 | 123/472 |
| 6,631,854 B1 * | 10/2003 | Stier | F02M 51/0603 | 239/102.1 |
| 7,451,942 B2 * | 11/2008 | Borissov | F02M 21/0269 | 123/527 |
| 7,527,041 B2 * | 5/2009 | Wing | F02M 51/0603 | 123/478 |
| 7,546,961 B2 * | 6/2009 | Cristiani | F02M 51/0671 | 239/456 |
| 7,712,684 B2 * | 5/2010 | Masuda | F02M 61/08 | 239/453 |
| 7,721,716 B1 * | 5/2010 | Harwood | F02M 57/027 | 123/495 |
| 7,886,993 B2 * | 2/2011 | Bachmaier | F02M 51/0603 | 239/102.1 |
| 8,555,860 B2 * | 10/2013 | McAlister | F02M 57/005 | 123/490 |
| 8,733,326 B2 * | 5/2014 | Kim | F02D 19/0694 | 123/525 |
| 8,800,895 B2 * | 8/2014 | Hicks | F23D 11/38 | 239/533.2 |
| 8,935,078 B1 * | 1/2015 | Lorts | F02M 69/54 | 123/457 |
| 9,200,561 B2 * | 12/2015 | McAlister | F02B 43/00 | |
| 9,309,846 B2 * | 4/2016 | McAlister | F02M 57/06 | |
| 9,366,195 B2 * | 6/2016 | Wager | F02D 19/0647 | |
| 9,371,824 B2 * | 6/2016 | Burger | F01N 3/2066 | |
| 9,377,114 B2 * | 6/2016 | Reifenberger | F16K 15/00 | |
| 2001/0032612 A1 * | 10/2001 | Welch | F02M 21/0254 | 123/294 |
| 2004/0164175 A1 * | 8/2004 | Maeurer | F02M 51/0603 | 239/102.2 |
| 2006/0131447 A1 * | 6/2006 | Masuda | F02M 61/08 | 239/533.2 |
| 2007/0023545 A1 * | 2/2007 | Cooke | F02M 45/086 | 239/533.12 |
| 2007/0125338 A1 * | 6/2007 | Kato | F02M 21/0254 | 123/304 |
| 2008/0041344 A1 * | 2/2008 | Wing | F02M 51/0603 | 123/472 |
| 2008/0141921 A1 * | 6/2008 | Hinderks | B63B 1/28 | 114/274 |
| 2014/0224903 A1 * | 8/2014 | Fujino | F02M 51/0664 | 239/585.1 |
| 2014/0260215 A1 * | 9/2014 | Cook | F01N 3/20 | 60/299 |
| 2015/0115055 A1 * | 4/2015 | Wager | F02D 19/0647 | 239/5 |
| 2015/0267659 A1 * | 9/2015 | Jaegle | F02M 45/086 | 239/533.3 |
| 2015/0369143 A1 * | 12/2015 | Brown | F02D 19/08 | 123/470 |
| 2015/0377201 A1 * | 12/2015 | Svensson | F02M 63/0077 | 123/445 |

\* cited by examiner

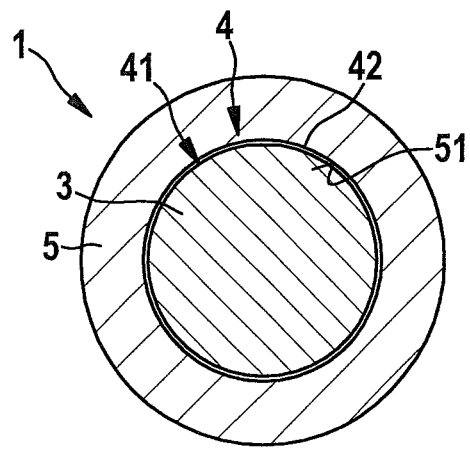
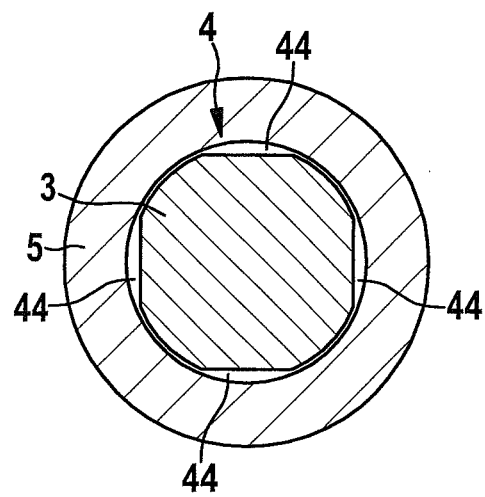
Fig. 7    Fig. 8
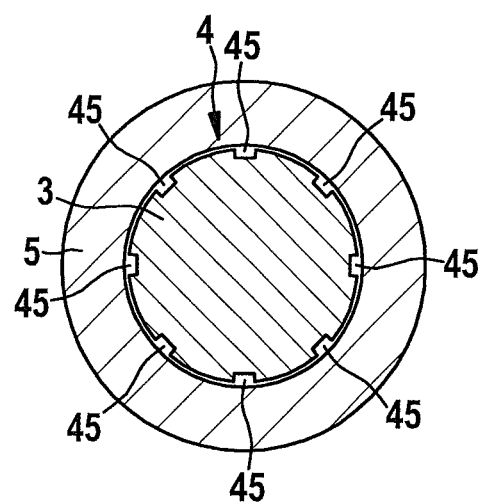
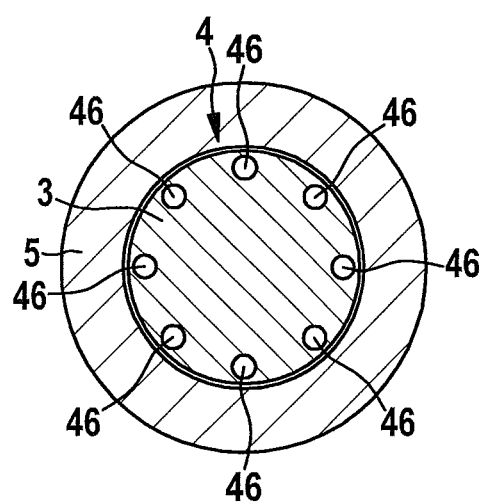
Fig. 9    Fig. 10

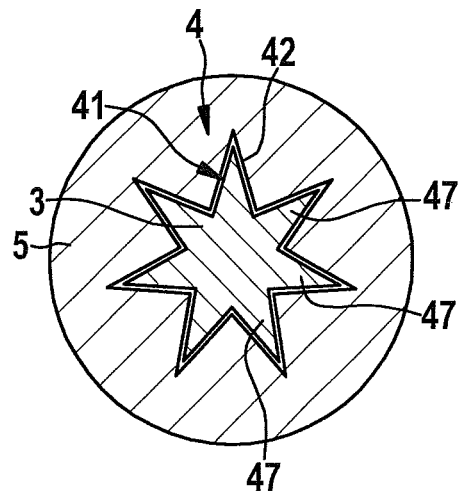
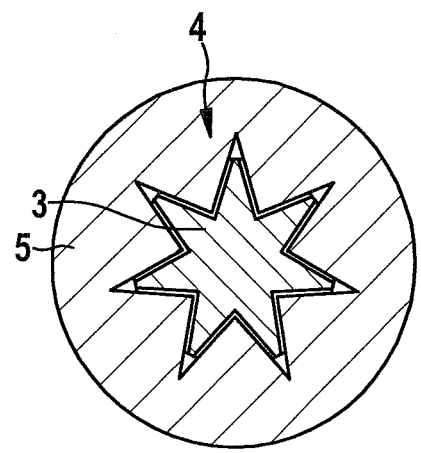
Fig. 12     Fig. 13
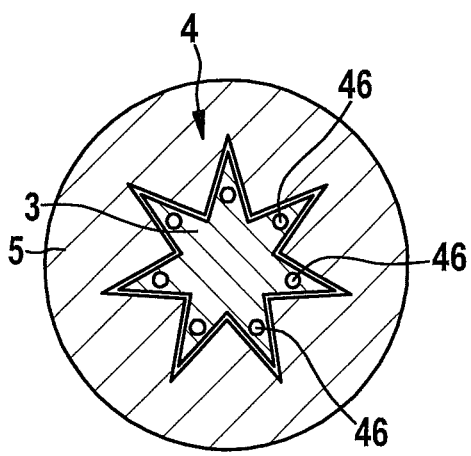
Fig. 14

GAS INJECTOR FOR THE DIRECT INJECTION OF GASEOUS FUEL INTO A COMBUSTION CHAMBER

RELATED APPLICATION INFORMATION

The present application claims priority to and the benefit of German patent application no. 10 2014 200 756.9, which was filed in Germany on Jan. 17, 2014, the disclosure of which is incorporated herein by reference.

FIELD OF THE INVENTION

The present invention relates to a gas direct injector for the direct injection of gaseous fuel, such as natural gas, into a combustion chamber of an internal combustion engine.

BACKGROUND INFORMATION

Apart from the frequently used liquid fuels, the use of gaseous fuels, such as natural gas or hydrogen, has been increasing over the past few years as well. However, the known injectors for liquid fuels are only conditionally suitable for such gaseous fuels, since gaseous fuels have different energy densities and volumes than liquid fuels. To ensure that internal combustion engines operated in this manner do not consume too much fuel, it is necessary to inject the most precise gas quantities possible in each injection. In the future, to save fuel, it will additionally be necessary to carry out one or more injection process(es) as well. Apart from the requirement of injecting a certain maximum quantity within a predefined period of time, it must also be possible to meter defined minimal gas quantities in a precise manner. The gas injector also needs to seal with respect to the combustion chamber between different injections. FIG. 1 schematically illustrates an example of a known gas injector 1, in which an outwardly opening valve needle 3 sits on a valve seat 2 inside a housing 5. FIG. 1 shows the closed state of the injector. FIG. 2 schematically shows a diagram of a characteristic of the effective overall opening cross-section A across lift H. Here, a linear characteristic comes about both for smaller lifts and for large lifts H, as long as the released annular cross-sectional area at the valve needle constitutes the smallest cross-section. Accordingly, a constant cross-sectional area $A_{max}$, which is independent of lift H, results as soon as the annular gap between nozzle needle 3 having radius R2 and the outer contour (radius R1) at valve seat 2 of the gas supply of the injector represents the smallest cross-section. For this reason the curve in the diagram of FIG. 2 is horizontal in the end region up to maximum lift $H_{max}$.

A conflict in goals between the metering of minimal quantities and a maximally desired quantity per injection cycle exists in the configuration of gas injectors. Because of the relatively low density of gaseous fuels, high volumes must be injected within a short period of time at space requirements that are comparable to an injector for liquid fuels. To do so, a gas injector should be able to release large cross-sections as rapidly as possible at a given lift. As a result, the concept of the gas injector shown in FIGS. 1 and 2 has the steepest possible cross-sectional characteristic over the lift. However, this makes it difficult to meter minimal quantities, and multiple injections, in particular, are impossible to realize.

SUMMARY OF THE INVENTION

In contrast, the gas injector according to the present invention for the direct injection of gaseous fuel into a combustion chamber of an internal combustion engine, having the features described herein, has the advantage of allowing also the metering of minimal gas quantities without any problems. In particular a multi-injection of fuel during an injection cycle is possible in this manner. In the present invention, this is achieved by developing a gas control region at a valve needle, which together with a component that surrounds the valve needle defines a second cross-sectional area. A change in the second cross-sectional area in response to a lift differs from a change in a first cross-sectional area at a valve seat during the opening operation of the valve needle. As a result, a second cross-sectional area, through which the gaseous fuel must flow until it reaches the actual valve seat, is able to be defined by the selection of a geometry. The second cross-sectional area varies across the lift of the valve needle and provides a further control curve for the gas quantity to be injected.

The further developments of the present invention are also described herein.

The second cross-sectional area at the gas-control region may be constant at the start of a lift of the valve needle up to a predefined lift length. This makes it possible to easily inject a small gas quantity at small lifts, since the first cross-sectional area at the valve needle becomes continually larger at the start of the lift.

Furthermore, the gas-control area may have a control edge, which has the form of a ring. This makes for an especially simple control of the gas quantity by way of geometry. In particular, the annular control edge may have a larger diameter than a diameter of the valve seat.

According to an alternative development of the present invention, the gas-control region has a control edge, which is configured in the form of a star or blossom and includes a multitude of jags or waves (petals). A long control edge, in particular, is realizable in this manner without enlarging the cross-sectional area or the radius of the housing in its respective dimensions. The geometric development of the control edge with star-shaped jags also makes for a relatively easy adaptation to different specifications of injectors, in that, for example, individual jags or jagged regions are removed, so that the cross-sectional conditions in the gas control region are able to be modified rapidly.

In a further manner, the gas control region has continuous recesses, or the gas control region has recesses at its outer periphery, such as removed jags, bulges or the like. This measure, as well, makes it possible to achieve an individual adaptation of the second cross-sectional area at the gas control region in a relatively uncomplicated manner.

The component that surrounds the valve needle especially may be a housing of the gas injector. This makes it possible to realize an especially compact and slender structure.

According to a further development of the present invention, the gas injector includes an additional sealing element, which is disposed in the gas control region. The sealing element may be situated at the control edge of the valve needle or situated on the component that surrounds the valve needle. The use of the additional sealing element makes it possible to realize a pre-valve in the gas control region, so that additional, more reliable sealing of the gas valve is possible. Since the actual valve seat at which the valve needle is sealing or releasing the first cross-sectional area is exposed to the relatively high temperatures at the combustion chamber, the use of the sealing element at the gas control region, for example, makes it possible to use even materials that would not be able to withstand the high temperatures at the combustion chamber. The sealing element may especially be an elastomer.

A cross-sectional area for ejecting gas at the valve seat of the gas valve may be in a range of 2 mm² to 6 mm². This ensures that gas quantities of sufficient size are able to reach the combustion chamber via the first cross-sectional area during a valve lift. A diameter of the annular control edge furthermore may be in a range of 7 mm² to 20 mm².

According to a further development of the present invention, an exiting gas mass flow is within a range of 5 to 15 g/s.

Furthermore, the gas injector may include a piezo actuator or, alternatively, a magnet armature as actuator. The present invention in particular also allows the use of magnetic actuators, so that very small lifts, and thus very small injection quantities, are realizable, despite the use of magnetic actuators.

The valve needle especially may be an outwardly opening valve needle.

The gas injector especially may be used for the direct injection of gaseous fuel into a combustion chamber of internal combustion engines of vehicles. As an alternative, the gas injector may also be used in stationary gas motors.

Furthermore, the gas injector according to the present invention has a relatively simple and robust configuration, so that especially also high gas pressures that are considerably higher than pressures in fluid fuel injection systems, for example, do not cause damage to the injector.

In addition, the present invention relates to a gas-operated internal combustion engine, which includes a gas injector according to the present invention.

Exemplary embodiments of the present invention are described in detail below, with reference to the accompanying drawing. Identical or functionally equivalent parts are designated by the same reference numerals.

BRIEF DESCRIPTION OF THE DRAWINGS

FIG. 7 shows a schematic sectional view along line VII-VII of FIG. 3.

FIGS. 8, 9 and 10 show schematic sectional views of alternative exemplary embodiments of a gas injector.

FIG. 12 shows a schematic sectional view along line XII-XII of FIG. 11.

FIGS. 13 and 14 show schematic sectional views of alternative exemplary embodiments.

DETAILED DESCRIPTION

Figure 1:
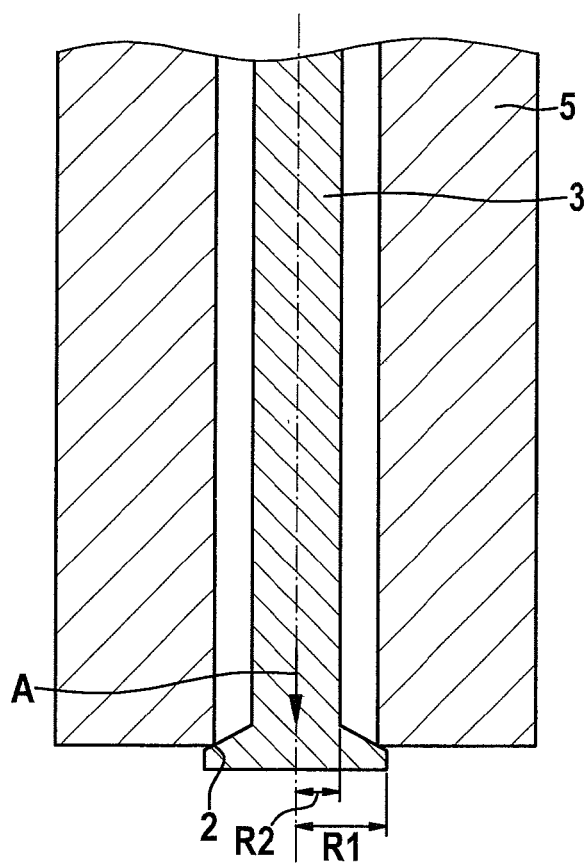
FIG. 1 shows a schematic sectional view of a gas injector according to the related art.

In the following text, a gas injector 1 according to a first exemplary embodiment of the present invention is described in detail with reference to FIGS. 3 through 7.

Schematically illustrated gas injector 1 includes a valve needle 3, which seals at a valve seat 2 configured on a housing 5. Valve seat 2 has a radius R3.

In addition, gas injector 1 has an inner gas control region 4, which includes a control edge 40 which radially projects in the outward direction from a base body of valve needle 3. Inner gas control region 4 has a cylindrical lateral surface 41, which is parallel to an inner lateral surface 51 of housing 5. This provides an annular gap 42 between housing 5 and inner gas control region 4. Control edge 40 has a radius R4. Annular gap 42 can be gathered from FIG. 7, in particular.

If an actuator (not shown) then moves valve needle 3 in the direction of arrow A, valve needle 3 lifts off from valve seat 2. As can be gathered from FIG. 4, a first cross-sectional area at valve seat 2 that increases at a constant gradient across a very small lift length H1 is released in the process. This cross-sectional area is denoted by A1 in FIG. 4 and corresponds to the cross-sectional area provided by annular gap 42. This cross-sectional area A1 remains constant across further lift H2, which corresponds to the height of lateral surface 41 of inner gas control region 4, since inner gas control region 4 retains the constant annular gap cross-section despite the fact that the first cross-sectional area at valve seat 2 becomes ever larger with increasing lift.

Figure 4:
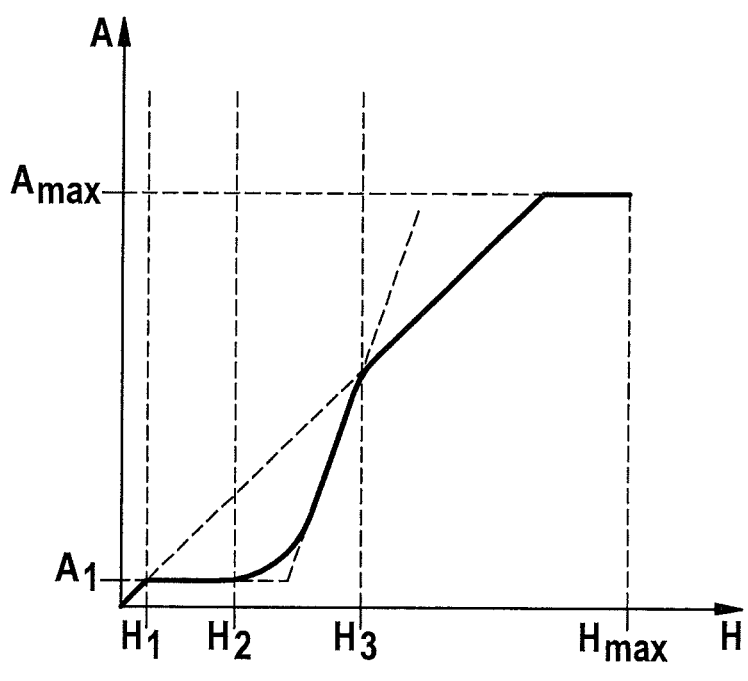
FIG. 4 shows a schematic illustration of a diagram which shows the effective opening area A across a lift H of the valve needle in the first exemplary embodiment.
Figure 6:
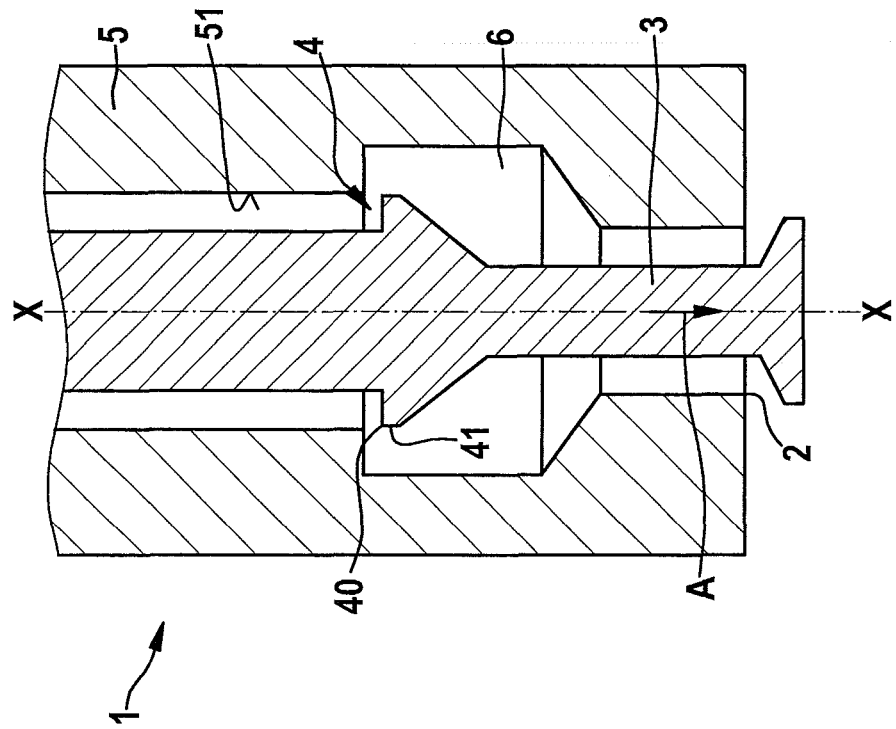
FIGS. 5 and 6 show different open positions of the gas injector of FIG. 3.
Figure 5:
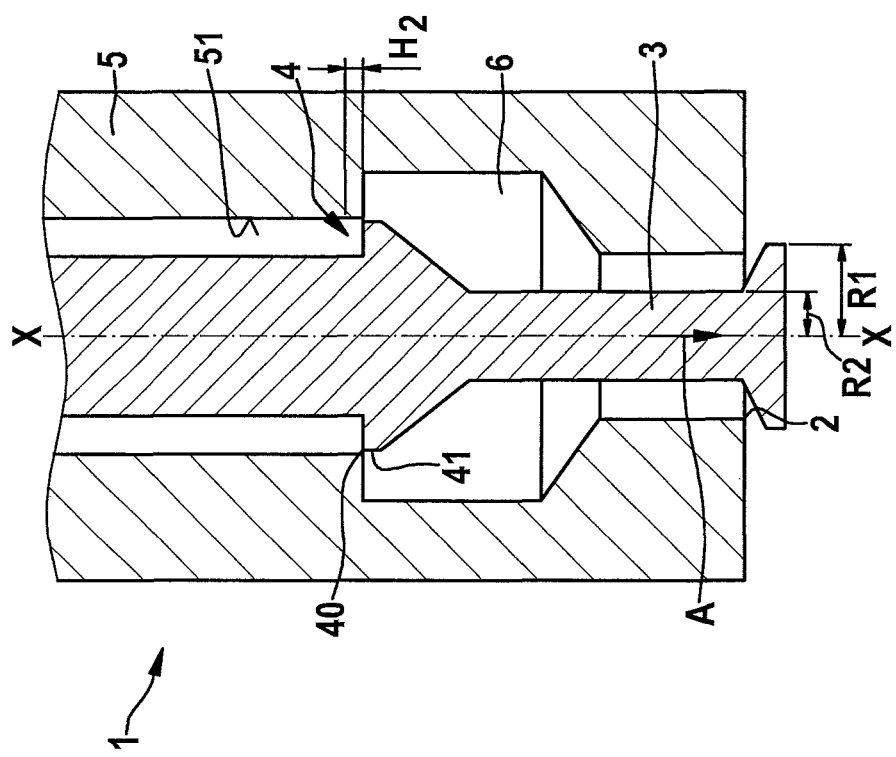

As soon as the valve needle attains the position illustrated in FIG. 5, the cross-sectional area at gas control region 4 enlarges continuously. This results in a rising effective cross-sectional area A in the region between lift length H2 and H3 in the diagram from FIG. 4, until first cross-sectional area at the valve seat is as large as the second cross-sectional area at inner gas control region 4. This state is illustrated in FIG. 6 and attained in FIG. 4 at lift length H3.

Figure 2:
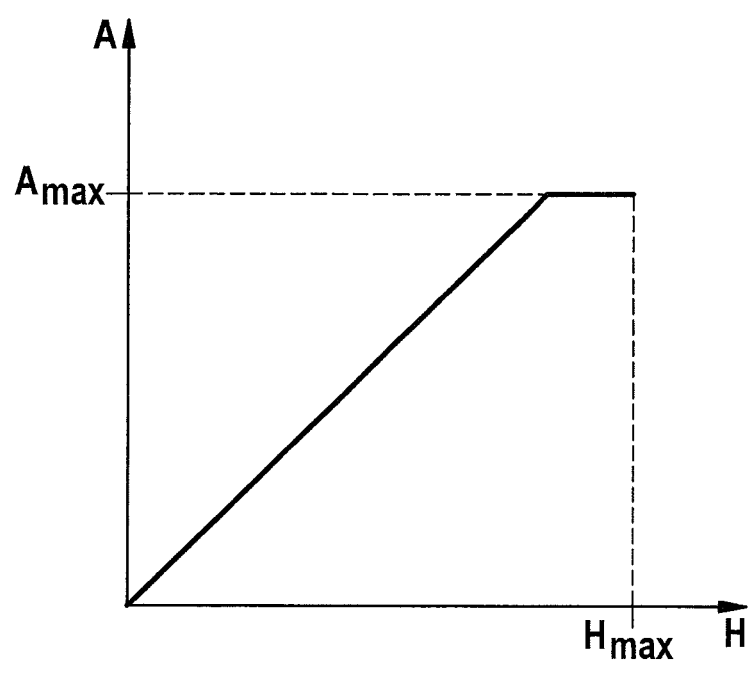
FIG. 2 shows a diagram, which represents the effective cross-sectional area A at the valve seat that opens in response to a lift H of a valve needle of the gas injector, according to the related art.
Figure 3:
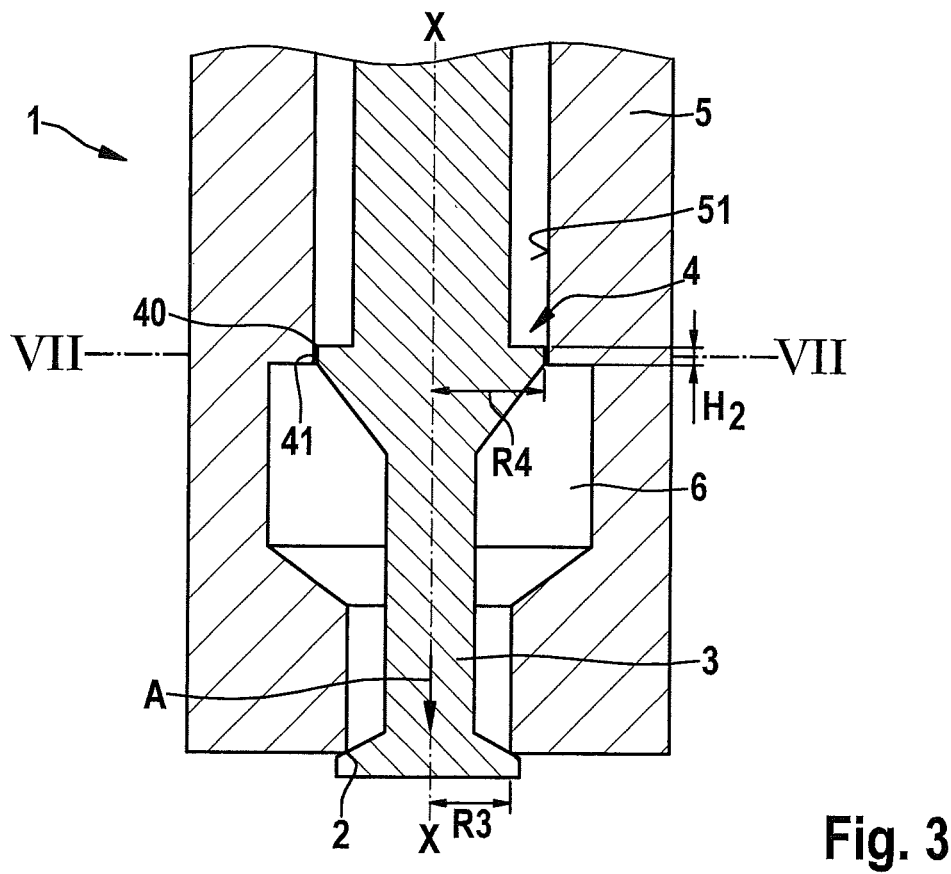
FIG. 3 shows a schematic sectional view of a gas injector according to a first exemplary embodiment, in the closed state.

In a further lift, the effective opening cross-sectional area that opens further at the valve seat is therefore no longer delimited by inner gas control region 4, but solely by the geometry at valve seat 2. As a result, starting with lift length H3, the curve shown in FIG. 4 corresponds to the curve having a constant gradient of the related art shown in FIG. 2, so that large gas quantities are injectable as well.

Downstream from inner gas control region 4 in the flow direction, gas injector 1 has a relatively large space 6, which has a large cross-section, in particular, so that once a predefined lift has occurred at inner gas control region 4, the inner gas control region no longer has an effect on the overall cross-sectional area for the injection of fuel.

According to the present invention, additional control edge 40 at inner gas control region 4 is therefore able to make available a precision-control region for minute gas quantities, which ranges up to a lift slightly beyond lift length H2 (compare FIG. 4). According to the present invention, by providing inner gas control region 4, influencing of effective cross-sectional area A is therefore possible, as a result of which it is also possible to supply only small gas quantities at small lifts. Starting with a certain lift length, which in particular is greater than lift length H3, it is nevertheless possible to supply a large injection quantity as required for gaseous fuels, since effective cross-sectional area A then depends solely on the geometry at valve seat 2. As a result, the gas injector according to the present invention can also satisfy the requirement that large cross-sections have to be released as rapidly as possible at a given lift in order to be able to inject large fuel gas quantities. This is important especially because gaseous fuels have a lower energy content at the same volume in comparison to liquid fuels.

The present invention furthermore also makes it possible to provide a multi-stage and repeated injections, and minimal quantities, in particular, are able to be metered precisely as well.

FIGS. 8 through 10 show alternative developments of inner gas control region 4; in FIG. 8, for instance, planar side surfaces 44 are configured, which define the flow rate in the region of the lift between lift lengths H1 and H2. Precisely four planar side surfaces 44 are provided in this context, two planar side surfaces 44 lying across from each other in each case.

In FIG. 9, a multitude of angular recesses 45 are provided at the outer periphery of gas control region 4 of valve needle 3, which extend in the axial direction X-X.

A multitude of cylindrical, axial through recesses 46 are configured in gas control region 4 of valve needle 3 in FIG. 10.

As these examples from FIGS. 8 through 10 illustrate, it is therefore possible to develop a control surface in an individual manner in a relatively uncomplicated manner through different geometry selections at gas control region 4, so that, for example, different gas injectors are easily able to be supplied for different vehicle manufacturers, on the basis of a fundamental concept.

Figure 11:
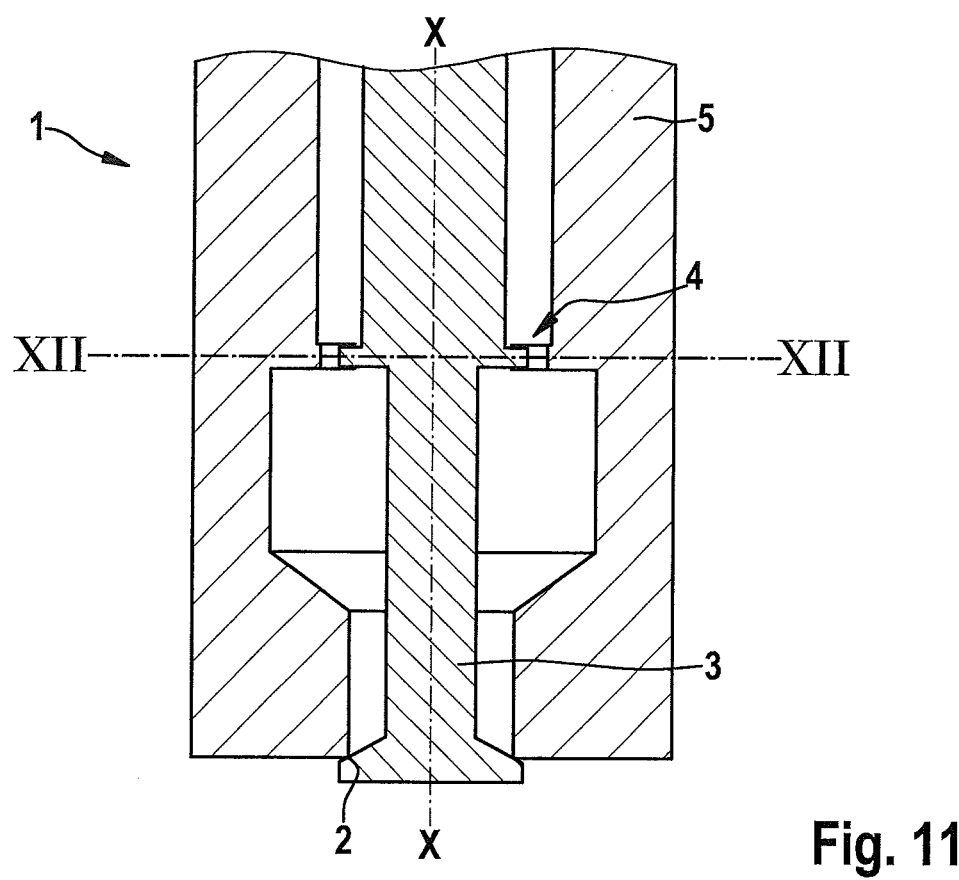
FIG. 11 shows a schematic sectional view of a gas injector according to a second exemplary embodiment of the present invention.

FIGS. 11 through 12 show a gas injector 1 according to a second exemplary embodiment of the present invention. In contrast to the first exemplary embodiment, inner gas control region 4 in the second exemplary embodiment is formed differently. As can be gathered from FIG. 12, inner gas control region 4 is provided in the form of a star which has a multitude of points 47. Similar to the first exemplary embodiment, the lateral region of inner gas control region 4 is once again parallel to an inner wall 51 of housing 5, which has a correspondingly formed star-shaped recess for inner gas control region 4.

As illustrated in FIGS. 13 and 14, here, too, it is possible to provide different cross-sectional areas by cutting the tips of points 47 (FIG. 13) or by providing through openings 46 (FIG. 14).

Figure 15:
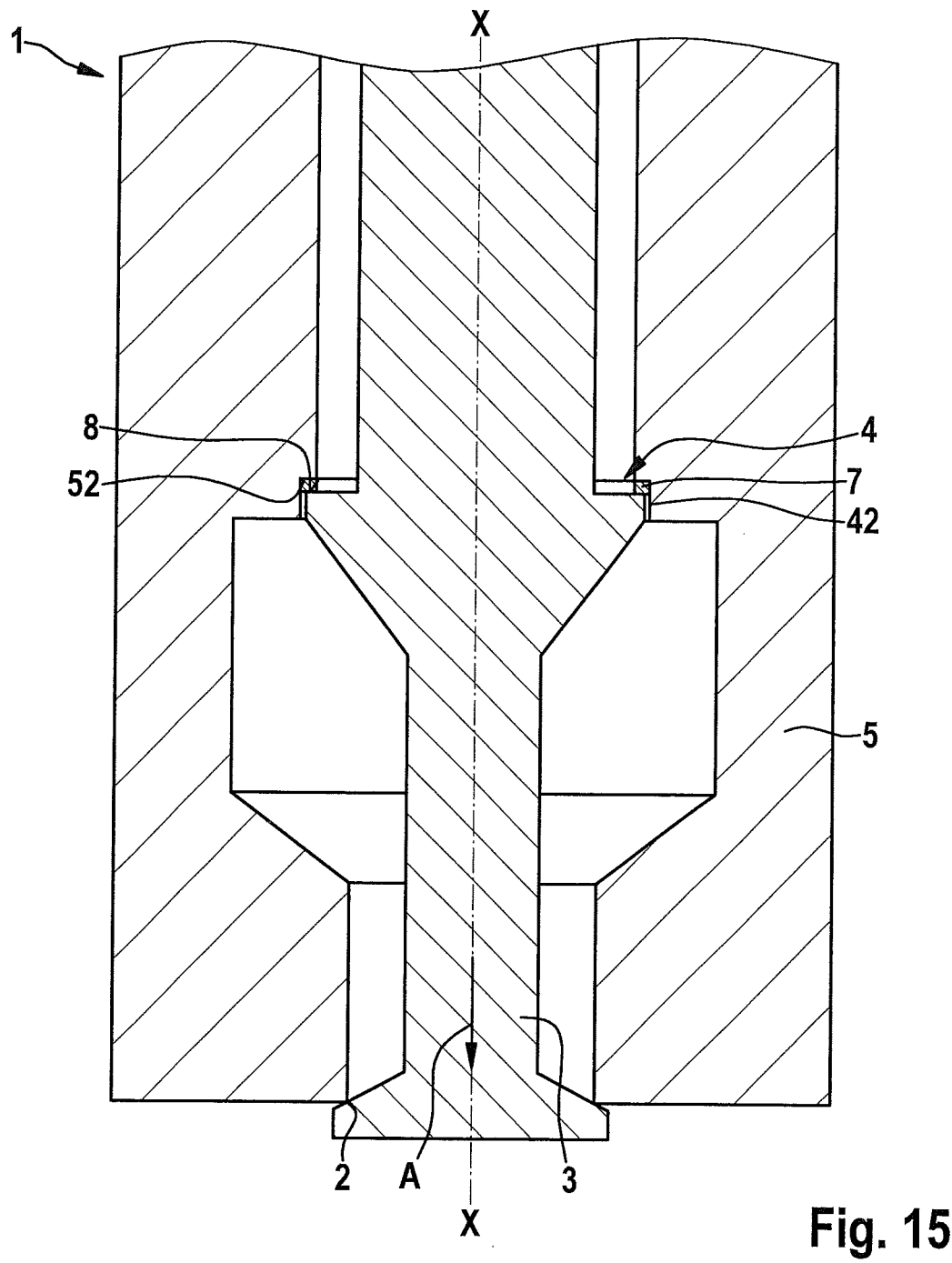
FIG. 15 shows a schematic sectional view of a gas injector according to a third exemplary embodiment of the present invention.

FIG. 15 shows a gas injector 1 according to a third exemplary embodiment of the present invention. Gas injector 1 of the third exemplary embodiment additionally also has an elastomeric sealing element 7, which is disposed at housing 5. A step 52 is provided on housing 11 for this purpose. Sealing element 7 together with a sealing surface 8 at the inner gas control region 4 forms a pre-valve. FIG. 15 shows the closed state of the valve, in which both the pre-valve and the main valve at valve seat 2 are closed. This makes it possible to use an elastomeric sealing element 7 for sealing gas injector 1, which otherwise would not be usable in gas direct injectors due to the direct placement at the combustion chamber for the direct injection of the gas into the combustion chamber. In addition, because of the use of sealing element 7, gas injector 1 provides additional safety as regards the sealing. The cross-sectional area changes in response to a lift at the first and second cross-sectional area correspond to the changes in the first exemplary embodiment.

What is claimed is:

1. A gas injector for directly injecting gaseous fuel into a combustion chamber of an internal combustion engine, comprising:
a valve seat;
a valve needle, which releases a first cross-sectional area at the valve seat in a lift; and
a gas control region situated at the valve needle and which defines a second cross-sectional area together with a component surrounding the valve needle;
wherein in response to a lift, a change in the first cross-sectional area at the valve seat differs from a change in the second cross-sectional area at the gas control region, and
wherein downstream from the gas control region in a flow direction, the gas injector has a space having a larger radius than a radius of the valve seat, so that once a predefined lift has occurred at the gas control region, the gas control region has no effect on an overall cross-sectional area for the injection of the gaseous fuel.

2. The injector of claim 1, wherein the second cross-sectional area at the gas-control region is constant up to a predefined lift length at the start of a lift of the valve needle.

3. The injector of claim 1, wherein the gas control region has a control edge, which has an annular shape.

4. The injector of claim 3, wherein the control edge has a larger diameter than a diameter of the valve seat.

5. The injector of claim 1, wherein the gas control region is configured in the form of a star or petals with a multitude of radially outwardly directed jags.

6. The injector of claim 1, wherein the gas control region has through recesses or in which subregions have been removed at the control edge of the gas control region.

7. The injector of claim 1, wherein the component surrounding the valve needle is a housing of the gas injector.

8. The injector of claim 1, further comprising:
a sealing element disposed at the gas control region of the valve needle or disposed at the component surrounding the valve needle to form a pre-valve.

9. The injector of claim 1, wherein at least one of the following is satisfied: (i) a cross-sectional area for the ejection of gas at the valve seat is in a range of 2 $mm^2$ to 6 $mm^2$, and (ii) a diameter of the annular control edge is in a range of 7 $mm^2$ to 20 $mm^2$.

10. The injector of claim 1, wherein an emerging gas mass flow is in the range from 5 g/s to 15 g/s.

11. The injector of claim 1, further comprising:
a sealing element, which includes an elastomer, disposed at the gas control region of the valve needle or disposed at the component surrounding the valve needle to form a pre-valve.

12. The injector of claim 11, wherein the gas control region is configured in the form of a star or petals with a multitude of radially outwardly directed jags.

13. The injector of claim 11, wherein the gas control region has through recesses or in which subregions have been removed at the control edge of the gas control region.

14. The injector of claim 1, wherein the second cross-sectional area at the gas-control region is constant up to a predefined lift length at the start of a lift of the valve needle, and wherein the gas control region has a control edge, which has an annular shape.

15. The injector of claim 14, wherein the control edge has a larger diameter than a diameter of the valve seat.

16. The injector of claim 14, wherein at least one of the following is satisfied: (i) a cross-sectional area for the ejection of gas at the valve seat is in a range of 2 $mm^2$ to 6 $mm^2$, and (ii) a diameter of the annular control edge is in a range of 7 $mm^2$ to 20 $mm^2$.

17. The injector of claim 14, further comprising:
a sealing element disposed at the gas control region of the valve needle or disposed at the component surrounding the valve needle to form a pre-valve;

wherein the component surrounding the valve needle is a housing of the gas injector.

18. The injector of claim 14, further comprising:

a sealing element, which includes an elastomer, disposed at the gas control region of the valve needle or disposed at the component surrounding the valve needle to form a pre-valve;

wherein the component surrounding the valve needle is a housing of the gas injector.

19. The injector of claim 14, wherein an emerging gas mass flow is in the range from 5 g/s to 15 g/s.

\* \* \* \* \*